US011111408B2

(12) United States Patent
Watanabe et al.

(10) Patent No.: US 11,111,408 B2
(45) Date of Patent: Sep. 7, 2021

(54) POLYESTER RESIN, WATER DISPERSION OF POLYESTER RESIN AND METHOD FOR PREPARING WATER DISPERSION

(71) Applicant: TOYOBO CO., LTD., Osaka (JP)

(72) Inventors: Naoko Watanabe, Shiga (JP); Yu Yamamoto, Shiga (JP); Hideki Tanaka, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/763,006

(22) PCT Filed: Nov. 27, 2018

(86) PCT No.: PCT/JP2018/043472
§ 371 (c)(1),
(2) Date: May 11, 2020

(87) PCT Pub. No.: WO2019/111746
PCT Pub. Date: Jun. 13, 2019

(65) Prior Publication Data
US 2020/0299538 A1 Sep. 24, 2020

(30) Foreign Application Priority Data
Dec. 8, 2017 (JP) .............................. JP2017-235875

(51) Int. Cl.
C09D 167/02 (2006.01)
C09D 7/20 (2018.01)
B32B 27/10 (2006.01)
B32B 27/12 (2006.01)
B32B 27/36 (2006.01)
B65D 65/40 (2006.01)
B65D 65/42 (2006.01)
C08G 63/685 (2006.01)
C09D 11/033 (2014.01)
C09D 11/104 (2014.01)
D21H 19/62 (2006.01)
D21H 27/10 (2006.01)
C09D 7/40 (2018.01)
C09D 11/00 (2014.01)
C09J 167/02 (2006.01)
C08G 63/16 (2006.01)
C08G 63/20 (2006.01)
C08G 63/18 (2006.01)
B32B 27/06 (2006.01)
C08L 67/02 (2006.01)
B32B 27/18 (2006.01)
B32B 27/08 (2006.01)
D21H 19/02 (2006.01)
C08G 63/78 (2006.01)

(52) U.S. Cl.
CPC ............ C09D 167/02 (2013.01); B32B 27/10 (2013.01); B32B 27/12 (2013.01); B32B 27/36 (2013.01); B65D 65/40 (2013.01); B65D 65/42 (2013.01); C08G 63/6858 (2013.01); C09D 7/20 (2018.01); C09D 11/033 (2013.01); C09D 11/104 (2013.01); D21H 19/62 (2013.01); D21H 27/10 (2013.01); B32B 27/06 (2013.01); B32B 27/08 (2013.01); B32B 27/18 (2013.01); B32B 2553/00 (2013.01); C08G 63/16 (2013.01); C08G 63/18 (2013.01); C08G 63/20 (2013.01); C08G 63/78 (2013.01); C08L 67/02 (2013.01); C08L 2201/50 (2013.01); C08L 2201/52 (2013.01); C08L 2201/54 (2013.01); C09D 7/40 (2018.01); C09D 11/00 (2013.01); C09J 167/02 (2013.01); C09J 2301/30 (2020.08); D21H 19/02 (2013.01); Y10T 428/3179 (2015.04); Y10T 428/31786 (2015.04); Y10T 428/31794 (2015.04); Y10T 442/20 (2015.04)

(58) Field of Classification Search
None
See application file for complete search history.

(56) References Cited

U.S. PATENT DOCUMENTS

| 5,385,788 A * | 1/1995 | Charleston | C08G 63/12 428/458 |
| 5,840,384 A * | 11/1998 | Noda | C09D 133/064 428/35.8 |
| 5,869,567 A * | 2/1999 | Fujita | C08J 3/03 524/608 |
| 6,069,221 A * | 5/2000 | Chasser | C08G 77/388 528/26 |
| 2003/0073425 A1* | 4/2003 | Immonen | G06Q 30/04 455/406 |

(Continued)

FOREIGN PATENT DOCUMENTS

CN 106752773 5/2017
CN 106752773 A * 5/2017

(Continued)

OTHER PUBLICATIONS

English Summary of Opposition filed against Japanese Patent No. 6579292 (Mar. 19, 2020).

(Continued)

Primary Examiner — Vivian Chen
(74) Attorney, Agent, or Firm — Wenderoth, Lind & Ponack, L.L.P.

(57) ABSTRACT

The present invention provides a polyester resin having a self-emulsifying function which is able to form an aqueous emulsion without using any emulsifier and organic solvent. The present invention also provides a water dispersion, an aqueous adhesive, an aqueous ink, a laminate and a packaging material containing the above polyester resin, as well as a method for preparing the water dispersion.

14 Claims, No Drawings

(56) References Cited

U.S. PATENT DOCUMENTS

| | | | |
|---|---|---|---|
| 2003/0100667 A1* | 5/2003 | Bendix | C09D 5/02 524/558 |
| 2003/0150359 A1* | 8/2003 | Lassmann | C09D 5/032 106/499 |
| 2005/0147834 A1* | 7/2005 | Bruchmann | B32B 27/00 428/458 |
| 2005/0165177 A1* | 7/2005 | Wagner | C08G 63/12 525/437 |
| 2007/0213501 A1* | 9/2007 | Bruchmann | C09D 167/00 528/302 |
| 2009/0304948 A1* | 12/2009 | Witter | C03C 17/42 427/511 |
| 2010/0040967 A1 | 2/2010 | Hamasaki et al. | |
| 2010/0120978 A1 | 5/2010 | Minesso et al. | |
| 2014/0065385 A1* | 3/2014 | Bruchmann | C09D 11/02 428/203 |
| 2014/0163157 A1* | 6/2014 | Minesso | C09D 167/00 524/539 |
| 2014/0193619 A1* | 7/2014 | Bruchmann | C09D 11/02 428/209 |
| 2015/0005174 A1 | 1/2015 | Tanaka et al. | |
| 2018/0039193 A1 | 2/2018 | Honda et al. | |

FOREIGN PATENT DOCUMENTS

| | | |
|---|---|---|
| JP | 47-40873 | 10/1972 |
| JP | 57-40525 | 3/1982 |
| JP | 9-227668 | 9/1997 |
| JP | 2007-238896 A * | 9/2007 |
| JP | 2008-13657 | 1/2008 |
| JP | 2008-239691 | 10/2008 |
| JP | 2010-128212 | 6/2010 |
| JP | 2010-523780 | 7/2010 |
| JP | 2014-139265 | 7/2014 |
| JP | 2014-139265 A * | 7/2014 |
| WO | WO 01/28306 A * | 4/2001 |
| WO | WO 01/59016 A * | 8/2001 |
| WO | 2008/059646 | 5/2008 |
| WO | 2008/125417 | 10/2008 |
| WO | 2013/122245 | 8/2013 |
| WO | 2016/136652 | 9/2016 |

OTHER PUBLICATIONS

International Search Report (ISR) dated Mar. 5, 2019 in International (PCT) Application No. PCT/JP2018/043472.

* cited by examiner

POLYESTER RESIN, WATER DISPERSION OF POLYESTER RESIN AND METHOD FOR PREPARING WATER DISPERSION

TECHNICAL FIELD OF THE INVENTION

The present invention relates to a polyester resin having a self-emulsifying function which is able to form a stable aqueous emulsion without using any emulsifier and organic solvent, to a water dispersion of polyester resin containing the same and to a method for preparing the water dispersion.

BACKGROUND ART

A polyester resin has been widely used as a material for resin compositions to be used for paints, coating agents, adhesives and the like. A polyester resin is usually constituted from a polyvalent carboxylic acid and a polyhydric alcohol. It is possible to freely control a selection of the polyvalent carboxylic acid and the polyhydric alcohol and a combination thereof as well as a level of molecular weight. The resulting polyester resin has been used in various applications such as paints and adhesives.

As to a mode of use of a polyester resin, it is common to prepare a solution in organic solvent or a dispersion in water, and to apply it to a substrate. In recent years however, paints, inks, coating agents, adhesives, tackifiers, sealants, primers and various treating agents for textile products, paper products, etc. are changing from a conventional organic solvent type to an aqueous type, high solid type or powder type, in view of environmental problems and suppression of discharge of volatile organic solvents. Particularly, the aqueous type system using a water dispersion is most common in view of good workability and working environment improvement, and has been regarded as promising.

As to examples wherein a polyester resin is dispersed into water and used as a binder ingredient, there are exemplified Patent Documents 1 to 4. Patent Document 1 discloses a use of a water dispersion wherein a polyester resin is compulsorily emulsified by an emulsifier. Patent Documents 2 and 3 disclose a copolymerized polyester which has a segment containing sulfonic acid metal base in a molecule. Patent Documents 2 and 3 show that this polyester is able to form a stable aqueous emulsion even when no emulsifier is added thereto, and thus this polyester has a self-emulsifying function. Patent Document 4 discloses a preparation method wherein a polymer of a lactic acid type is reacted with a polyvalent carboxylic acid or an acid anhydride thereof followed by adding a base and water thereto whereupon self-emulsifying particles are prepared.

PRIOR ART DOCUMENTS

Patent Documents

Patent Document 1: Japanese Patent Application Laid-Open (JP-A) No. 2008-13657
Patent Document 2: Japanese Patent Pre-grant Publication No. 40873/72
Patent Document 3: Japanese Patent Application Laid-Open (JP-A) No. 40525/82
Patent Document 4: Japanese Patent Application Laid-Open (JP-A) No. 2014-139265

DISCLOSURE OF THE INVENTION

Problem that the Invention is to Solve

The present inventors have investigated the prior art, and found the following problems therein. In Patent Document 1, an emulsifier is used for preparing a water dispersion of resin. Accordingly, when the resulting water dispersion is used as a binder ingredient, the emulsifier remains in an interface between the resin and a target to be coated whereupon the adhesive property lowers. In Patent Document 2, a stable water dispersion is prepared without using any emulsifier. When the resulting water dispersion is used as a binder ingredient, a high adhesive property is achieved. However, it is necessary to use a lot of hydrophilic material in order to exhibit an excellent solubilizing or dispersing ability to water. Accordingly, water resistance of the resulting coat is very inferior. In Patent Document 3, an operation of removing a solvent is conducted during the production step of a water dispersion. Accordingly, there is a space for improvement in view of suppression of discharge of volatile organic solvents. In Patent Document 4, a polylactic acid-type skeleton having a high hydrolyzing property is introduced into a polymer. Accordingly, the resulting self-emulsifying particles cannot be used in applications which require high resistance to hydrolysis. In addition, polylactic acid is deteriorated at 180° C. or higher to lower a molecular weight. Accordingly, the resulting self-emulsifying particles cannot be developed to applications which require heat resistance.

The present invention has been achieved on the background of such problems in the prior art. Thus, an object of the present invention is to provide a polyester resin being excellent in heat resistance as compared with polylactic acid and having a self-emulsifying function which is able to form an aqueous emulsion without using any emulsifier and organic solvent. Another aim of the present invention is to provide a water dispersion, an aqueous adhesive, an aqueous ink, a laminate and a packaging material containing the above polyester resin, as well as a method for preparing the water dispersion.

Means for Solving the Problem

As a result of extensive investigations, the present inventors have found that the above problems can be solved by the following means and achieved the present invention. Thus, the present invention comprises the following constitutions.
<1>
A polyester resin represented by the following chemical structure of formula (I) and having an acid value of 250 to 2,500 eq/$10^6$ g and a number-average molecular weight of 2,000 to 50,000:

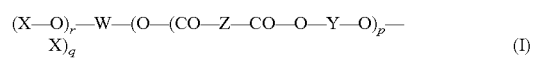

$$(X-O)_r-W-(O-(CO-Z-CO-O-Y-O)_p-X)_q \quad (I)$$

wherein W is a (q+r)-valent organic group;
(CO—Z—CO—O—Y—O) is a skeleton of polyester resin prepared by polymerization using a polyvalent carboxylic acid ingredient Z and a polyhydric alcohol ingredient Y as polymerizing ingredients;
X is a residue of polybasic acid having two or more carboxyl groups or is hydrogen (except the case wherein all of X in numbers of (q+r) are hydrogen);
X, Y and Z each may be the same as or different from each other and, even in the same repetitive unit, X, Y and Z each may be the same as or different from each other;
average value of p is 3 or more, average value of q is more than 0 and is 15 or less, average value of r is 0 or more and is less than 15, and (q+r) is 3 or more and 15 or less.
<2>
The polyester resin according to <1>, wherein W in the formula (I) is a residue of a polyhydric alcohol having hydroxyl groups in numbers of (q+r).

<3>

The polyester resin according to <1> or <2>, wherein W in the formula (I) is one or more residue(s) selected from the group consisting of a residue of pentaerythritol, a residue of sorbitol and a residue of inositol.

<4>

The polyester resin according to any of <1> to <3>, wherein X in the formula (I) is one or more residue(s) selected from the group consisting of a residue of trimellitic anhydride, a residue of succinic anhydride and a residue of maleic anhydride.

<5>

A water dispersion of polyester resin containing the polyester resin mentioned in any of <1> to <4>, a basic compound and water.

<6>

The water dispersion of polyester resin according to <5>, wherein it contains no emulsifier.

<7>

The water dispersion of polyester resin according to <5> or <6>, wherein it contains no organic solvent.

<8>

A method for preparing a water dispersion of polyester resin, comprising a step wherein the polyester resin mentioned in any of <1> to <4>, a basic compound and water are mixed without addition of any emulsifier and organic solvent, whereby the water dispersion of the polyester resin is obtained.

<9>

The water dispersion of polyester resin according to any of <5> to <7>, wherein it further contains a curing agent.

<10>

The water dispersion of polyester resin according to <9>, wherein the curing agent is one or two or more member (s) selected from the group consisting of polyvalent epoxy compound, oxazoline resin, carbodiimide resin, isocyanate compound, melamine resin and polyvalent metal salt.

<11>

An aqueous adhesive containing the water dispersion of polyester resin of <9> or <10>.

<12>

An aqueous paint containing the water dispersion of polyester resin of <9> or <10>.

<13>

An aqueous ink containing the water dispersion of polyester resin of <9> or <10> and a coloring material.

<14>

A laminate comprising a layer containing the polyester resin mentioned in any of <1> to <4> (layer A) and a layer made of film, sheet, woven fabric, nonwoven fabric or paper (layer B).

<15>

A packaging material having the laminate mentioned in <14> as a constituting element.

Effects of the Invention

The polyester resin of the present invention contains a high concentration of carboxyl groups in a molecular chain. Accordingly, the polyester resin of the present invention can easily form a water dispersion by mere stirring with an aqueous solution of a basic compound without using any emulsifier and organic solvent. That is, the polyester resin of the present invention exhibits an excellent dispersing ability in water. In addition, since the water dispersion of polyester resin of the present invention can be prepared without using any emulsifier, it is excellent in terms of adhesive property.

Further, when the water dispersion of polyester resin of the present invention is compounded with a curing agent having a reactivity to carboxyl groups, it is possible to easily prepare an adhesive layer or ink being excellent in adhesive property and in water resistance. Still further, the polyester resin of the present invention is excellent in terms of heat resistance as compared with polylactic acid.

BEST MODE FOR CARRYING OUT THE INVENTION

The present invention is a polyester resin represented by the following chemical structure (I) and having an acid value of 250 to 2,500 eq/$10^6$ g and a number-average molecular weight of 2,000 to 50,000:

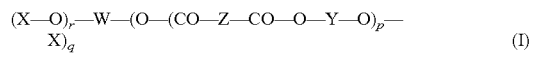

wherein W is a (q+r)-valent organic group;

(CO—Z—CO—O—Y—O) is a skeleton of polyester resin prepared by polymerization using a polyvalent carboxylic acid ingredient Z and a polyhydric alcohol ingredient Y as polymerizing ingredients;

X is a residue of polybasic acid having two or more carboxyl groups or is hydrogen (except the case wherein all of X in numbers of (q+r) are hydrogen);

X, Y and Z each may be the same as or different from each other and, even in the same repetitive unit, X, Y and Z each may be the same as or different from each other;

average value of p is 3 or more, average value of q is more than 0 and is 15 or less, average value of r is 0 or more and is less than 15, and (q+r) is 3 or more and 15 or less. That is, the polyester resin of the present invention is a polyester resin wherein terminals thereof are modified with X.

The acid value of the polyester resin of the present invention is from 250 eq/$10^6$ g to 2500 eq/$10^6$ g and preferably from 300 eq/$10^6$ g to 2300 eq/$10^6$ g. The acid value of the polyester resin of the present invention is mainly derived from many carboxyl groups contained in molecular chain terminals. When the acid value is within the above range, the polyester resin can form a water dispersion even if organic solvent and emulsifier are not added (in other others, a self-emulsifying property is expressed). Moreover, emulsion particles having a small particle size can be formed. When the acid value of the polyester resin is set to the above lower limit or more, the self-emulsifying property can be achieved. In addition, a curing property of the cured coat can be enhanced. On the other hand, when the acid value of the polyester resin is set to the upper limit or less, hydrolysis hardly happens even in a state of solid resin whereby stability upon storage becomes good. In addition, the cured coat obtained by using the polyester resin of the present invention exhibits good water resistance.

The number-average molecular weight of the polyester resin of the present invention is from 2,000 to 50,000, preferably from 3,000 to 45,000, and more preferably from 4,000 to 40,000. When the number-average molecular weight is set to the above lower limit or more, cohesive force of the polyester resin does not become too small and both adhesive property and water resistance become good. On the other hand, when the number-average molecular weight is set to the above upper limit or less, the cohesive force of the polyester resin does not become too large and dispersing property in water becomes good. Due to those reasons, not only when a water dispersion is prepared by a method wherein the resin is once dissolved in a solvent followed by subjecting to a phase transfer to an aqueous system but also when a water dispersion is directly prepared by a method wherein the resin is mixed only with a base compound and water, it is possible to obtain a water dispersion having good dispersing property in water, wherein particle size does not become rough and large and thus particles do not precipitate.

In the polyester resin of the present invention, the above (CO—Z—CO—O—Y—O) is a polymer which is obtained by condensation polymerization of several kinds of monomers consisting of a polyvalent (divalent or higher) carboxylic acid ingredient Z and polyhydric (dihydric or higher) alcohol ingredient Y. (Hereinafter, it may be also called a polyester resin (A).) As to a method for the polymerization thereof, there is no particular limitation but known methods can be used.

When the condensation polymerization of the above polyester resin (A) is conducted, a polymerization catalyst may be used. As to the polymerization catalyst, there may be exemplified a titanium compound (such as tetra-n-butyl titanate, tetraisopropyl titanate and titanium oxyacetylacetonate), an antimony compound (such as tributoxy antimony and antimony trioxide), a germanium compound (such as tetra-n-butoxy germanium and germanium oxide), a zinc compound (such as zinc acetate) and an aluminum compound (such as aluminum acetate and aluminum acetylacetate). One or two or more thereof may be used. In view of reactivity of the polymerization, a titanium compound is preferred.

As to the polyvalent (divalent or higher) polyvalent carboxylic acid ingredient Z, it is preferred to use an aromatic polyvalent carboxylic acid, an aliphatic polyvalent carboxylic acid or an alicyclic polyvalent carboxylic acid. As to examples of the alicyclic polyvalent carboxylic acid, there may be exemplified an alicyclic dicarboxylic acid such as 1,4-cyclohexanedicarboxylic acid, 1,3-cyclohexanedicarboxylic acid, 1,2-cyclohexanedicarboxylic acid and acid anhydrides thereof. As to examples of the aliphatic polyvalent carboxylic acid, there may be exemplified an aliphatic dicarboxylic acid such as succinic acid, adipic acid, azelaic acid, sebacic acid, dodecanedioic acid and dimer acid. As to examples of the aromatic polyvalent carboxylic acid, there may be exemplified an aromatic dicarboxylic acid such as terephthalic acid, isophthalic acid, orthophthalic acid, naphthalene-dicarboxylic acid, biphenyl dicarboxylic acid, diphenic acid and 5-hydroxyisophthalic acid. There may be also exemplified an aromatic dicarboxylic acid having a sulfonic acid group or a sulfonic acid base such as sulfo-terephthalic acid, 5-sulfo-isophthalic acid, 4-sulfophthalic acid, 4-sulfonaphthanene-2,7-dicarboxylic acid, 5-(4-sulfophenoxy)-isophthalic acid, sulfoterephthalic acid and/or metal salt, ammonium salt, etc. thereof. One or more member(s) can be selected therefrom. Preferred one is an aromatic dicarboxylic acid or an aliphatic dicarboxylic acid. Among them, terephthalic acid, isophthalic acid, adipic acid or sebacic acid is particularly preferred.

As to the polyhydric (dihydric or higher) alcohol ingredient, it is preferred to use an aliphatic glycol, an alicyclic glycol, a glycol containing an ether bond or a glycol containing an aromatic group. As to examples of the aliphatic glycol, there may be exemplified ethylene glycol, 1,2-propylene glycol, 1,3-propanediol, 1,4-butanediol, 1,5-pentanediol, 2-methyl-1,3-propanediol, neopentyl glycol, 1,6-hexanediol, 3-methyl-1,5-pentanediol, 1,7-heptanediol, 1,8-octanediol, 1,9-nonanediol, 2-ethyl-2-butylpropanediol, neopentyl glycol hydroxypivalate, dimethylolheptane, 2,2,4-trimethyl-1,3-pentanediol, etc. As to examples of the alicyclic glycol, there may be exemplified 1,4-cyclohexanediol, 1,4-cyclohexanedimethanol, tricyclodecane diol, tricyclodecane dimethylol, spiroglycol, hydrogenated bisphenol A, an adduct of hydrogenated bisphenol A with ethylene oxide or with propylene oxide, etc. As to examples of the glycol containing an ether bond, there may be also used diethylene glycol, triethylene glycol, dipropylene glycol, polyethylene glycol, polypropylene glycol, polytetramethylene glycol, an addict of neopentyl glycol with ethylene oxide or an adduct of neopentyl glycol with propylene oxide, if necessary. As to examples of the glycol containing an aromatic group, there may be exemplified p-xylene glycol, m-xylene glycol, o-xylene glycol, 1,4-phenylene glycol, an adduct of 1,4-phenylene glycol with ethylene oxide, bisphenol A, a glycol prepared by addition of one to several mole (s) of ethylene oxide or propylene oxide to each of two phenolic hydroxyl groups of bisphenols such as an adduct of bisphenol A with ethylene oxide and propylene oxide, etc. One or more member (s) can be selected therefrom. Preferred one is an aliphatic glycol or a glycol containing an ether bond. Among them, ethylene glycol, 1,4-butanediol or diethylene glycol is particularly preferred. When a total polyhydric alcohol ingredient in the polyester resin (A) is taken as 100 molar %, a total amount of the aliphatic glycol and the glycol containing an ether bond is preferred to be 80 molar % or more, more preferred to be 90 molar % or more, further preferred to be 95 molar % or more, and may also be 100 molar %. When the total amount of the aliphatic glycol and the glycol containing an ether bond is too small, dispersing property in water and adhesive property may lower.

As to the polyvalent carboxylic acid having three or more functional groups constituting the polyester resin (A) of the present invention, there may be exemplified trimellitic acid, pyromellitic acid, methylcyclohexene tricarboxylic acid, oxydiphthalic acid dianhydride (ODPA), 3,3',4,4'-benzophenone tetracarboxylic acid dianhydride (BTDA), 3,3',4,4'-diphenyl-tetracarboxylic acid dianhydride (BPDA), 3,3',4,4'-diphenylsulfone tetracarboxylic acid dianhydride (DSDA), 4,4'-(hexafluoroisopropylidene)diphthalic acid dianhydride (6FDA), 2,2'-bis[(dicarboxyphenoxy)phenyl] propane dianhydride (BSAA), etc. As to the polyhydric alcohol having three or more functional groups constituting the polyester resin (A) of the present invention, there may be exemplified glycerol, pentaerythritol, trimethylol ethane, trimethylol pentane and trimethylol propane. One or more member(s) can be selected therefrom. When a total polyvalent carboxylic acid ingredient in the polyester resin (A) is taken as 100 molar %, an amount of the polyvalent carboxylic acid having three or more functional groups is preferred to be 10 molar % or less, more preferred to be 8 molar % or less, further preferred to be 5 molar % or less, and may also be 0 molar %. When it is too much, the polyethylene resin (A) may be gelled.

In the polyester resin (A) of the present invention, the above-mentioned W is an organic group having the valence of (q+r). The (q+r) is 3 or more and preferably 4 or more. When the (q+r) is set to the above value or more, a number of carboxyl groups in the polyester resin does not become too small and thus dispersing in water becomes easy. Also, the (q+r) is 15 or less, preferably 10 or less, and more preferably 8 or less. When the (q+r) is set to the above value or less, the number of carboxyl groups in the polyester resin do not become too large and the stability upon storage becomes good.

When the polyester resin is a mixture comprising two or more polyester resins, q is an average value of the mixture. It is necessary that the average value of q is more than 0. The average value of q is preferably 1 or more, more preferably 2 or more, further preferably 3 or more, and particularly preferably 4 or more. Also, the average value of q is 15 or less, preferably 13 or less, more preferably 10 or less, further preferably 8 or less, and particularly preferably 6 or less. In order to control the average value of q within the above range, it is preferred that q of each polyester resin is an integer of 1 or more. The q of each polyester resin is more preferably 2 or more, further preferably 3 or more, and particularly preferably 4 or more. Also, the q of each polyester resin is preferably 20 or less, more preferably 18 or less, and further preferably 15 or less.

The average value of q stands for an average value of a number of addition of (CO—Z—CO—O—Y—O) in W. For example, when a compound wherein the addition number of (CO—Z—CO—O—Y—O) is 10 occupies 50 molar %, a compound wherein the addition number of (CO—Z—CO—O—Y—O) is 8 occupies 30 molar % and a compound wherein the addition number of (CO—Z—CO—O—Y—O) is 6 occupies 20 molar % in the polyester resin, the average value of q becomes 8.6. A calculation formula is as follows. Thus, (the average value of q)=[(10×50 molar %)+(8×30 molar %)+(6×20 molar %)]/100 molar %=8.6.

When the polyester resin is a mixture comprising two or more polyester resins, r is an average value of the mixture. The average value of r is 0 or more. The average value of r is preferably 1 or more, more preferably 2 or more, and further preferably 3 or more. Also, the average value of r is less than 15, preferably 13 or less, more preferably 10 or less, further preferably 8 or less, and particularly preferably 6 or less. In order to control the average value of r within the above range, it is preferred that r of each polyester resin is 0 or more. The r of each polyester resin is more preferably 1 or more and further preferably 2 or more. Also, the r of each polyester resin is preferably 20 or less, more preferably 18 or less, and further preferably 15 or less.

The average value of r stands for an average value of a number of addition of (X—O) in W. For example, when a compound wherein the addition number of (X—O) is 10 occupies 50 molar %, a compound wherein the addition number of (X—O) is 8 occupies 30 molar % and a compound wherein the addition number of (X—O) is 6 occupies 20 molar % in the polyester resin, the average value of r becomes 8.6. A calculation formula is as follows. Thus, (the average value of r)=[(10×50 molar %)+(8×30 molar %)+(6×20 molar %)]/100 molar %=8.6.

Although there is no particular limitation for W, there may be exemplified a polyhydric alcohol having 3 or more hydroxyl groups, and derivatives thereof. As to examples of the polyhydric alcohol having three hydroxyl groups, there may be exemplified trimethylolpropane, glycerol, 1,3,5-cyclohexanetriol, etc. As to examples of the polyhydric alcohol having four or more hydroxyl groups, there may be exemplified pentaerythritol, dipentaerythritol, diglycerol, polyglycerol, xylitol, sorbitol, glucose, fructose, mannose, etc. Each of those polyhydric alcohols may be used solely or two or more thereof may be used jointly. Among the above, trimethylolpropane, pentaerythritol, and sorbitol are preferred since it has two or more primary hydroxyl groups and further has many hydroxyl groups. When an amount of hydroxyl groups contained in W becomes large, a multi-branched skeleton is apt to be formed. Therefore, an acid value can be enhanced by introducing a large amount of carboxyl groups by means of acid addition. As a result, it becomes easy to achieve both resin strength and water dispersibility.

When two or more polyhydric alcohols having different organic group valences are used, (q+r) is an average value of the organic group valences of W. For example, when an organic group of 8 valences occupies 30 molar %, an organic group of 5 valences occupies 50 molar % and an organic group of 3 valences occupies 20 molar % in 100 molar % of W, the average value of organic group valances of W becomes 5.5. A calculation formula is as follows. Thus, (the average value of organic group valences of W)=[(8 valences×30 molar %)+(5 valences×50 molar %)+(3 valences×20 molar %)]/100 molar %=5.5. Thus (q+r) in this case becomes 5.5.

When the polyester resin is a mixture comprising two or more polyester resins, p is an average value of the mixture. In the polyester resin of the present invention, an average value of p in the above —(CO—Z—CO—O—Y—O)$_p$— is 3 or more, preferably 4 or more, and more preferably 5 or more. When the average value of p is the above value or more, it is possible to prevent the number-average molecular weight of the polyester resin from becoming too small. As a result thereof, cohesive force of the polyester resin can be maintained and thus adhesive force and water resistance become good. On the other hand, the average value of p is preferred to be 50 or less, more preferred to be 40 or less, and further preferred to be 30 or less. When the average value of p is the above value or less, it is possible to prevent the number-average molecular weight of the polyester resin from becoming too large. As a result thereof, it is possible to prevent the cohesive force of the polyester resin from becoming too high and, relatively, to ensure that some concentration of X is contained in the polyester resin as well. As a result thereof, the acid value of the polyester can be also controlled within the above-defined range and thus water dispersibility becomes good. In order to control the average value of p within the above range, it is preferred that p of each polyester resin is an integer of 0 or more. The p of each polyester resin is more preferably 1 or more, further preferably 2 or more, and particularly preferably 3 or more. Also, the p of each polyester resin is preferably 60 or less, more preferably 50 or less, and further preferably 40 or less.

The average value of p stands for an average number of a repeating unit of (CO—Z—CO—O—Y—O) in the polyester resin. For example, when a compound wherein the number of the repeating unit of (CO—Z—CO—O—Y—O) is 10 occupies 50 molar %, a compound wherein the number of the repeating unit of (CO—Z—CO—O—Y—O) is 8 occupies 30 molar % and a compound wherein the number of the repeating unit of (CO—Z—CO—O—Y—O) is 6 occupies 20 molar % in 100 molar % of the polyester resin, the average value of p becomes 8.6. A calculation formula is as follows. Thus, (the average value of p)=[(10×50 molar %)+(8×30 molar %)+(6×20 molar %)]/100 molar %=8.6.

The repeating unit of (CO—Z—CO—O—Y—O) may exist in one chain in a continued manner or may exist in different chains in a dispersed manner. For example, when (q+r) is 4 and p is 15, it may be in such a structure wherein q=3 and r=1 and 15 repeating units of (CO—Z—CO—O—Y—O) exist in one chain in a continued manner as shown in the following formula (II), or it may be in such a structure wherein q=4 and r=0 and 2, 3, 4 and 6 repeating units of (CO—Z—CO—O—Y—O) are heterogeneously added to four chains, respectively as shown in the following formula (III).

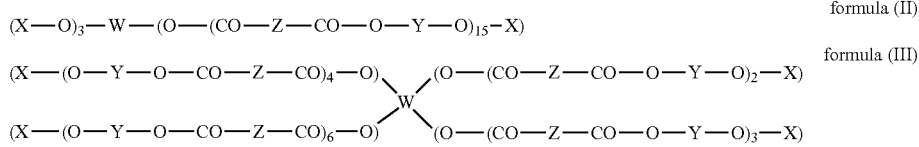

In the polyester resin of the present invention, the above X is a residue of polybasic acid residue containing two or more carboxyl groups or is hydrogen. However, the case is excluded wherein all of X in the numbers of (q+r) are hydrogen. In other words, at least one of them is a residue of polybasic acid containing two or more carboxyl groups. Preferably, 25% or more of X in the numbers of (q+r) is a residue of polybasic acid containing two or more carboxyl groups. More preferably, 50% or more of X is a residue of polybasic acid containing two or more carboxyl groups. Further preferably, 75% or more of X is a residue of polybasic acid containing two or more carboxyl groups. Particularly preferably, 90% or more of X is a residue of polybasic acid containing two or more carboxyl groups. It is also possible that all of X are residues of polybasic acid containing two or more carboxyl groups. It is preferred that X is different from Z.

As to the polybasic acid, there may be exemplified an aromatic dicarboxylic acid such as terephthalic acid, isophthalic acid, orthophthalic acid or naphthalene dicarboxylic acid as well as an acid anhydride thereof; an aliphatic dicarboxylic acid such as succinic acid, glutaric acid, adipic acid, azelaic acid, sebacic acid, dodecanedioic acid or dimer acid as well as acid anhydride thereof; an unsaturated dicarboxylic acid such as maleic acid, fumaric acid an adduct of terpene with maleic acid as well as an acid anhydride thereof; an alicyclic dicarboxylic acid such as 1,4-cyclohexanedicarboxylic acid, tetrahydrophthalic acid, hexahydrophthalic acid or 1,2-cyclohexenedicarboxylic acid as well as an acid hydride thereof; and a carboxylic acid of three or more valences such as trimellitic acid or methylcyclohexene-tricarboxylic acid as well as an acid anhydride thereof. Among them, trimellitic anhydride, succinic anhydride or maleic anhydride is preferred. Trimellitic anhydride is particularly preferred. Trimellitic anhydride can be easily reacted in an addition reaction and can introduce two carboxyl groups into a molecule. Accordingly, it is possible to introduce abundant acid values, which is advantageous in terms of water dispersing.

As to the polybasic acid, there may be also exemplified an acid dianhydride such as pyromellitic anhydride (PMDA), oxydiphthalic acid dianhydride (ODPA), 3,3',4,4'-benzophenone tetracarboxylic acid dianhydride (BTDA),3,3',4,4'-diphenyl-tetracarboxylic acid dianhydride (BPDA), ethylene glycol bisanhydrotrimellitate (TMEG), 3,3',4,4'-diphenylsulfone tetracarboxylic acid dianhydride (DSDA), 4,4'-(hexafluoroisopropylidene)diphthalic acid dianhydride (6FDA), 2,2'-bis[(dicarboxyphenoxy)phenyl]propane dianhydride (BSAA), or glycerol trisanhydrotrimellitate. Ethylene glycol bisanhydrotrimellitate (TMEG) is particularly preferred. TMEG can be subjected to an addition reaction at a relatively low temperature. Also, TMEG exhibits small cohesive force and good water dispersibility. Each of those polybasic acids may be used solely or two or more thereof may be used jointly.

There is no particular limitation for a method for preparing the polyester resin of the present invention. For example, a polyester resin (A) prepared from a carboxylic acid ingredient Z consisting of divalent or higher polyvalent carboxylic acid compound and a glycol ingredient Y consisting of dihydric or higher polyhydric alcohol compound is subjected to a depolymerization reaction by a polyhydric alcohol W having three or more hydroxyl groups and, after that, terminal hydroxyl groups of the polyester resin (A) are reacted with a polybasic acid X so as to introduce carboxyl groups into the terminals of the molecule whereby the polyester resin of the present invention is prepared.

It is preferred that each material is used after reducing its water content by conducting a vacuum drying or the like so that the ring in the polybasic acid anhydride does not open by the reaction with water contained in the polymerization system. It is also preferred to conduct the polymerization in vacuo or in an inert gas atmosphere so as to avoid the affection by water during the polymerization. Moreover, a rate of polymerization can be increased by using a conventionally known acid addition catalyst. Examples thereof are amines such as triethylamine and benzyl dimethylamine; quaternary ammonium salts such as tetramethylammonium chloride and triethyl benzylammonium chloride; imidazoles such as 2-ethyl-4-imidazole; pyridines such as 4-dimethyl-aminopyridine; phosphines such as triphenylphosphine; phosphonium salts such as tetraphenylphosphonium bromide; sulfonium salts such as sodium p-toluenesulfonate; sulfonic acids such as p-toluenesulfonic acid; and organic metal salts such as zinc octylate. More preferred ones are amines, pyridines and phosphines. The rate of polymerization can be increased particularly when 4-dimethylamino-pyridine is used.

When the polyester resin of the present invention is polymerized, it is effective to add various kinds of antioxidants. When a polymerization temperature is high or a polymerization time is long, deterioration by oxidation is apt to take place if a segment having low heat resistance such as polyether is copolymerized. In such a case, addition of the antioxidant is particularly effective. As to the antioxidant, there may be exemplified known ones such as phenol-type antioxidant, phosphorus-type antioxidant, amine-type antioxidant, sulfur-type antioxidant, nitro compound-type antioxidant and inorganic compound-type antioxidant. A phenol-type antioxidant having a relatively high heat resistance is preferred. The amount of the antioxidant to be added to 100 parts by mass of the resulting polyester resin is preferred to be from 0.05 part by mass to 0.5 part by mass.

Since the polyester resin of the present invention exhibits good water dispersibility, it can be easily dispersed in warm water in the presence of a basic compound. Temperature of the liquid in the preparation of a water dispersion is preferred to be from 30° C. to 85° C. It is more preferred to be from 40° C. to 80° C. and further preferred to be from 45° C. to 75° C. Although the dispersing proceeds even when the water temperature is low, that is time-consuming. As the water temperature raises, a dispersing speed increases. However, when the water temperature is too high, a hydrolyzing rate of the polyester segment tends to become high and thus the number-average molecular weight of the polyester resin of the present invention tends to lower.

As to the basic compound used in the preparation method of the water dispersion of polyester resin of the present invention, there are exemplified ammonia, organic amine compound, inorganic basic compound, etc.

As to the specific examples of the organic amine compound, there are exemplified alkylamines such as triethylamine, isopropylamine, ethylamine, diethylamine and sec-butylamine; alkoxyamines such as 3-ethoxypropylamine, propylamine and 3-methoxypropylamine; alkanolamines such as N,N-diethylethanolamine, N,N-dimethylethanolamine, aminoethanolamine, N-methyl-N,N-diethanolamine, monoethanolamine, diethanolamine and triethanolamine; and morpholines such as morpholine, N-methylmorpholine and N-ethylmorpholine. Among those organic amine compounds, alkanolamines having high hydrophilicity or, particularly, triethanolamine are/is preferred in view of enhancing the water dispersibility.

As to the specific examples of the inorganic basic compound, there may be exemplified alkali metal hydroxides such as lithium hydroxide, sodium hydroxide and potassium hydroxide; alkali metal hydrogen carbonates and carbonates such as sodium hydrogen carbonate and sodium carbonate; and ammonium carbonate. The basic compound of polyvalent metal may form a salt which is hardly soluble in water with a plurality of carboxyl groups contained in the polyester resin of the present invention, and which deteriorates the dispersibility. Accordingly, it is preferred that, when the basic compound of polyvalent metal is used, the adding amount thereof is limited to be small.

The adding amount of the basic compound needs to be in such an amount which is enough for neutralizing at least a part of the carboxyl groups in the polyester resin of the present invention. To be more specific, it is desired to add 0.5 to 1.0 equivalent of the basic compound to the acid value of the polyester resin of the present invention. It is also possible that a water dispersion is formed by using a basic compound in less than 1.0 equivalent to the acid value of the polyester resin of the present invention, and then the basic acid compound is additionally added whereby the final adding amount of the basic compound is adjusted to be from 0.5 to 1.0 equivalent to the acid value. At that time, it is preferred, in view of suppression of hydrolysis of the polyester segment, that pH of the water dispersion is adjusted to 6.5 to 7. When the adding ratio of the basic compound is too low, water dispersibility tends to become low while, when it is too high, pH of the water dispersion may become high and thus the polyester may be hydrolyzed.

In order to prepare the water dispersion of polyester resin of the present invention, it is not necessary to use an emulsifier or an organic solvent although its use is not always excluded. There are some cases wherein further stabilization of the water dispersion is possible by using various types of nonionic emulsifiers and anionic emulsifiers. Also, in some cases, more stable water dispersion can be prepared when the polyester resin of the present invention is previously dissolved in an appropriate organic solvent followed by subjecting to a phase transition.

Amount of the emulsifier contained in the water dispersion to 100 parts by mass of the polyester resin is preferred to be 10 parts by mass or less, more preferred to be 5 parts by mass or less, further preferred to be 1 part by mass or less, and may also be 0 part by mass. Amount of the organic solvent contained in the water dispersion to 100 parts by mass of the polyester resin is preferred to be 30 parts by mass or less, more preferred to be 20 parts by mass or less, further preferred to be 10 parts by mass or less, and may also be 0 part by mass.

The water dispersion of polyester resin of the present invention can be used as an adhesive. When a curing agent reacting with a carboxyl group is added at that time, an adhesive having a higher adhesive force can be obtained. As to such a curing agent, there may be used various curing agents such as an amino resin of melamine type, benzoguanamine type, etc., a polyvalent isocyanate compound, a polyvalent oxazoline compound, a polyvalent epoxy compound, a phenol resin, a carbodiimide compound, etc. Particularly, a polyvalent epoxy compound and a polyvalent oxazoline compound are preferred since they are highly reactive to carboxyl groups whereby the curing is possible at low temperature and the high adhesive force can be achieved. Among them, a polyvalent epoxy compound is particularly preferred. A polyvalent metal salt can be also used as a curing agent.

When the curing agent as such is used, its compounding amount to 100 parts by mass of the polyester resin of the present invention is preferred to be 1 to 50 part(s) by mass, more preferred to be 3 to 40 parts by mass, and further preferred to be 5 to 30 parts by mass. When the compounding amount of the curing agent is less than 5 parts by mass, a curing property tends to become insufficient while, when it is more than 50 parts by mass, the coat tends to become too hard.

As to the polyvalent epoxy compound appropriate as the curing agent for the aqueous adhesive of the present invention, there may be exemplified novolak-type epoxy resin, bisphenol-type epoxy resin, trisphenolmethane-type resin, amino acid-containing epoxy resin and copolymerization-type epoxy resin. As to examples of the novolak-type epoxy resin, there may be exemplified a product prepared reacting phenols such as phenol, cresol and alkylphenol with formaldehyde in an acidic catalyst so as to obtain novolak, and then by reacting the obtained novolak with epichlorohydrin and/or methyl epichlorohydrin. As to examples of the bisphenol-type epoxy resin, there are exemplified a product prepared by reacting bisphenol such as bisphenol A, bisphenol F or bisphenol S with epichlorohydrin and/or methyl epichlorohydrin; and a product prepared by reacting bisphenol A diglycidyl ether with the above bisphenol so as to obtain a condensate, and then by reacting the obtained condensate with epichlorohydrin and/or methyl epichlorohydrin. As to examples of trisphenolmethane-type epoxy resin, there may be exemplified a product prepared by reacting trisphenolmethane, triscresolmethane, etc. with epichlorohydrin and/or methyl epichlorohydrin. As to examples of the amino group-containing epoxy resin, there may be exemplified glycidylamine-type ones such as tetraglycidyl diaminodiphenylmethane, triglycidyl p-aminophenol, tetraglycidyl bisaminomethylcyclohexanone and N,N,N',N'-tetraglycidyl-m-xylenediamine. As to examples of the copolymerization-type epoxy resin, there may be exemplified a copolymer of glycidyl methacrylate with styrene, a copolymer of glycidyl methacrylate with styrene and methyl methacrylate and a copolymer of glycidyl methacrylate with cyclohexylmaleimide.

Since a water dispersion of polyester resin of the present invention has a self-emulsifying effect, even an epoxy compound which is insoluble in water can be also used as a curing agent. However, a water-soluble epoxy resin can be used more easily and is preferred. As to examples of the water-soluble epoxy resin, there may be exemplified such ones wherein a part of hydroxyl groups in a water-soluble compound (such as polyethylene glycol, glycerol and derivatives thereof and sorbitol) is changed to glycidyl group. To be more specific, there may be exemplified polyglycol glycidyl ether, glycerol polyglycidyl ether and sorbitol-type polyglycidyl ether. As to commercially available water-soluble epoxy resin, there may be exemplified SR-EGM, SR-8EG (polyglycol glycidyl ether), SR-GLG (glycerol polyglycidyl ether) and SR-SEP (sorbitol-type polyglycidyl ether) manufactured by Sakamoto Yakuhin Kogyo KK and Denacol (registered trademark) EX-614, EX-512, EX-412, etc. manufactured by Nagase ChemteX Corporation.

As to the polyvalent oxazoline compound suitable as a curing agent for an aqueous adhesive of the present invention, there may be used commercially available oxazoline compounds. To be more specific, there may be used Epocros (registered trade mark) WS-500, WS-700, Epocros K-2010E, Epocros K-2020K, etc. manufactured by Nippon Shokubai.

As to the carbodiimide compound suitable as a curing agent for an aqueous adhesive of the present invention, there may be used commercially available carbodiimide compounds. To be more specific, there may be used Carbodilite V-02, V-04, etc. manufactured by Nisshinbo.

As to the polyvalent metal salt suitable as a curing agent for an aqueous adhesive of the present invention, there may be used calcium salt, zinc salt, aluminum salt, etc. Calcium chloride and ammonium zinc carbonate are particularly preferred.

As to the phenol resin suitable as a curing agent for an aqueous adhesive of the present invention, there may be exemplified a condensate of alkylated phenol and/or cresol with formaldehyde. To be more specific, there may be exemplified a condensate of alkylated phenol being alkylated with an alkyl group (such as methyl group, ethyl group, propyl group, isopropyl group or butyl group), p-tert-amylphenol, 4,4'-sec-butylidenephenol, p-tert-butylphenol, o-cresol, m-cresol, p-cresol, p-cyclohexylphenol, 4,4'-isopropylidenephenol, p-nonylphenol, p-octylphenol, 3-pentadecylphenol, phenol, phenyl o-cresol, p-phenylphenol, xylenol, etc. with an aldehyde.

As to the amino resin which is suitable as a curing agent for an aqueous adhesive of the present invention, there may be exemplified adducts of urea, melamine, benzoguanamine, etc. with formaldehyde, and alkyl ether compounds which are prepared by alkoxylation of the above compounds with an alcohol having 1 to 6 carbon atom(s). To be more specific, there may be exemplified methoxylated methylol urea, methoxylated methylol-N,N-ethyleneurea, methoxylated methylol dicyandiamide, methoxylated methylol melamine, methoxylated methylol benzoguanamine, butoxylated methylol melamine and butoxylated methylol benzoguanamine. Preferred ones are methoxylated methylol melamine, butoxylated methylol melamine and methylolated benzoguanamine. Each of them may be used either solely or jointly.

The polyvalent isocyanate compound suitable as a curing agent for the aqueous adhesive of the present invention may be any of low molecular compound and high molecular compound. As to the low molecular compound, there may be exemplified an aliphatic isocyanate compound such as tetramethylene diisocyanate, hexamethylene diisocyanate and xylylene diisocyanate; an aromatic isocyanate compound such as toluene diisocyanate and diphenylmethane diisocyanate; and an alicyclic isocyanate such as hydrogenated diphenylmethane diisocyanate, hydrogenated xylylene diisocyanate and isophorone diisocyanate. Trimers, etc. of those isocyanate compounds may be also exemplified. As to the high molecular compound, there may be exemplified a terminal isocyanate group-containing compound prepared by reacting a compound having a plurality of active hydrogens with an excessive amount of the low molecular polyisocyanate compound. As to the compound having a plurality of active hydrogens, there may be exemplified a polyhydric alcohol such as ethylene glycol, propylene glycol, trimethylolpropane, glycerol and sorbitol; a polyvalent amine such as ethylenediamine; a compound having hydroxyl groups and amino groups such as monoethanolamine, diethanolamine and triethanolamine; and a polymer containing active hydrogens such as polyester polyol, polyether polyol and polyamide.

The polyvalent isocyanate compound may also be a blocked isocyanate. As to a blocking agent for the isocyanate, there may be exemplified a phenol such as phenol, thiophenol, methyl thiophenol, cresol, xylenol, resorcinol, nitrophenol and chlorophenol; an oxime such as acetoxime, methyl ethyl ketoxime and cyclohexanone oxime; an alcohol such as methanol, ethanol, propanol and butanol; a halogen-substituted alcohol such as ethylene chlorohydrin and 1,3-dichloro-2-propanol; a tertiary alcohol such as t-butanol and t-pentanol; and a lactam such as ε-caprolactam, δ-valerolactam, γ-butyrolactam and β-propyllactam. Besides the above, there may be also exemplified aromatic amine, imide, acetylacetone, acetoacetate, ethyl malonate and other active methylene compound as well as mercaptan, imine, urea, diaryl compound, sodium bisulfite, etc. The blocked isocyanate can be prepared by means of addition reaction of the isocyanate compound with an isocyanate-blocking agent by a known appropriate method.

An aqueous ink can be prepared by compounding a water dispersion of polyester resin of the present invention with a coloring material. When a curing agent having a reactivity to a carboxyl group is further compounded, water resistance of the ink can be enhanced. As to the coloring material, known pigment and dye may be used. The polyester resin of the present invention has high acid value, and thus its dispersibility in various pigments is high. Accordingly, it is possible to produce an aqueous ink in high concentrations. As to the curing agent, those exemplified for the adhesive can be used. Compounding amount of the coloring material to 100 parts by mass of the polyester resin is preferred to be 1 to 20 part(s) by mass and more preferred to be 2 to 10 parts by mass.

An aqueous paint can be prepared by compounding a water dispersion of polyester resin of the present invention with various pigments and additives. When a curing agent having a reactivity to a carboxyl group is further compounded, water resistance of the coat can be enhanced. As to the pigment, there may be compounded a known organic/inorganic coloring pigment, an extender such as calcium carbonate and talc, a rust-preventing pigment such as minium and lead suboxide and various functional pigments such as aluminum powder and zinc sulfide (fluorescent pigment). As to the additive, there may be compounded a commonly used additive for paints such as plasticizer, dispersing agent, sedimentation preventer, emulsifier, thickener, defoamer, fungicide, antiseptic agent, anti-skinning agent, anti-sagging agent, delustering agent, antistatic agent, conductive agent and flame retardant. The polyester resin of the present invention has high acid value, and thus its dispersibility in various pigments is high. Accordingly, it is possible to produce an aqueous paint in high concentrations. As to the curing agent, those exemplified for the adhesive can be used. Compounding amount of the pigment and compounding amount of the additive to 100 parts by mass of the polyester resin is preferred to be 1 to 20 part (s) by mass and more preferred to be 2 to 10 parts by mass, respectively.

Viscous property and viscosity of the water dispersion, the aqueous adhesive, the aqueous paint and the aqueous ink of the present invention can be adjusted to levels suitable for workability by compounding them with various thickeners. As to the thickener, nonionic ones such as methylcellulose and polyalkylene glycol derivatives and anionic ones such as polyacrylate and alginate are preferred in view of stability of the system by addition of the thickener.

Applicability of the water dispersion, the aqueous adhesive, the aqueous paint and the aqueous ink of the present invention can be further enhanced by compounding them with various types of adjusting agent for surface tension. As to the adjusting agent for surface tension, there may be exemplified those of acryl type, vinyl type, silicone type and fluorine type although there is no particular limitation therefor. Among the above, the surface tension adjusting agents of acryl and vinyl types are preferred since they hardly deteriorate the adhesive property. When the adding amount of the surface tension adjusting agent is excessive, the adhesive strength tends to be deteriorated. Therefore, the adding amount is preferred to be 1 part by mass or less and more preferred to be 0.5 part by mass or less to 100 parts by mass of the polyester resin.

The water dispersion obtained by the present invention may be compounded with known additives such as smoothening agent, defoamer, antioxidant, dispersing agent and lubricant during the preparation of the water dispersion or after the preparation of the water dispersion.

Light-resisting and oxidation-resisting properties of the water dispersion, the aqueous adhesive, the aqueous paint and the aqueous ink of the present invention can be further enhanced by addition of various types of ultraviolet absorbers, antioxidants or light stabilizers. Weather resistance can be also enhanced by addition of an emulsion or aqueous solution of the ultraviolet absorber, antioxidant or light stabilizer to the water dispersion of polyester resin. As to the ultraviolet absorber, any of the organic type such as benzotriazole type, benzophenone type and triazine type and the inorganic type such as zinc oxide may be used. As to the antioxidant, various ones generally used for polymers such as hindered phenol, phenothiazine and nickel compound may be used. As to the light stabilizer, various ones generally used for polymers may be used and that of a hindered amine type is effective. Each of compounding amount of the ultraviolet absorbers, antioxidants or light stabilizers to 100 parts by mass of the polyester resin is preferred to be 0.1 to 20 part (s) by mass and more preferred to be 0.2 to 10 part (s) by mass.

A laminate can be prepared by lamination of a layer containing the polyester resin of the present invention (layer A) with a layer selected from the group consisting of film, sheet, woven fabric, nonwoven fabric and paper (layer B). The laminate can be easily prepared by, for example, applying the aqueous adhesive and/or the aqueous ink of the present invention to the layer selected from the group consisting of film, sheet, woven fabric, nonwoven fabric and paper (layer B) followed by drying. The aqueous adhesive and the aqueous ink of the present invention exhibit a strong adhesive force to film, sheet, woven fabric, nonwoven fabric and paper made of various materials. A particularly high adhesive force is exhibited to a film and a sheet prepared from polylactic acid, polyester, polyurethane, polyamide, cellulose, starch, vinyl chloride, vinylidene chloride and chlorinated polyolefin as well as from chemically reformed substances thereof. In addition, the aqueous adhesive and the aqueous ink containing the polyester resin of the present invention exhibit a high adhesive force to a film being vapor-deposited with various metals as well. Accordingly, its use as a laminate in a three-layer structure of (layer A)/(layer vapor-deposited with metal)/(layer B) is also advantageous. Although there is no particular limitation for the metal used for the layer being vapor-deposited with metal and the layer B, a film being vapor-deposited with aluminum exhibits a particularly high adhesive force to the aqueous adhesive and the aqueous ink of the present invention. It is likely that the reason why the aqueous adhesive and the aqueous ink of the present invention exhibit a high adhesive force to the film vapor-deposited with various metals is that the polyester resin of the present invention has a predetermined acid value.

The above laminate can be used as a constituting element of a package material. Although the package material is not particularly limited, its examples are that for food and medical use.

EXAMPLES

As hereunder, the present invention will be more specifically illustrated by referring to Examples although the present invention is not limited by the following Examples. It is possible to carry out the present invention by addition of appropriate changes within a scope which is suitable to the gist of the present invention. Any of them is covered by the technical scope of the present invention.

Hereinafter, the term "part" means part by mass unless otherwise stipulated. The measuring and evaluating methods adopted in the specification are as specified below.

<Resin Composition>

A polyester resin sample was dissolved in heavy chloroform or heavy dimethyl sulfoxide. $^1$H-NMR analysis and $^{13}$C-NMR analysis were conducted using an NMR apparatus 400-MR manufacture by Variant. Resin composition was determined from an integral ratio thereof and expressed in % by mass.

<Value of (q+r) (Average Value of Organic Group Valence of W)>

$$\text{Value of}(q+r)=\Sigma(t\times u)/100$$

t: Number (valence) of organic group valence of W u: Amount (in molar %) of (q+r)-valent organic group when total W ingredient is taken as 100 molar %

<Average Value of q>

$$\text{Average value of } q=\Sigma(r_q\times s_q)/100$$

$r_q$: Number (valence) of organic group valence of W to which (CO—Z—CO—O—Y—O) is added $s_q$: Amount (in molar %)

<Average Value of r>

$$\text{Average value of } r=\Sigma(r_r\times s_r)/100$$

$r_r$: Number (valence) of organic group valence of W to which (X—O) is added $s_r$: Amount (in molar %)

<Average Value of p>

$$\text{Average value of } p=\Sigma(r_p\times s_p)/100$$

$r_p$: Number of repeating unit of (CO—Z—CO—O—Y—O)

$s_p$: Amount (in molar %)

<Number-Average Molecular Weight>

A polyester resin sample was dissolved in tetrahydrofuran so as to adjust the resin concentration about 0.5% by mass. The resulting solution was filtered through a membrane filter made of polyethylene tetrafluoride in 0.5 μm pore size. The resulting filtrate was used as a sample for the measurement. Number-average molecular weight was measured by gel permeation chromatography (GPC), using tetrahydrofuran as a mobile phase, and a differential refractometer as a detector. Flow rate was set to 1 mL/minute and column temperature was set to 30° C. As to the columns, KF-802, 804L and 806L manufactured by Showa Denko were used. Monodispersed polystyrene was used as a standard for molecular weight.

<Acid Value>

A polyester resin sample (0.8 g) was dissolved in 20 ml of N,N-dimethylformamide. Titration was conducted by a 0.1N methanolic solution of sodium methoxide, using phenolphthalein as an indicator. A point wherein the solution turned red was adopted as a neutralization point. An acid value was expressed by converting into an equivalent per $10^6$ g of the polyester resin (eq/$10^6$ g).

<Stability Upon Storage>

A polyester resin sample was stored for ten days at 50° C. and 60% RH. After that, number-average molecular weight thereof was measured and a change in the molecular weight was evaluated. The change in the molecular weight was determined by the following formula.

$$|(Mn\ before\ storing\ for\ ten\ days)-(Mn\ after\ storing\ for\ ten\ days)|/(Mn\ before\ storing\ for\ ten\ days)$$

(Judgment)

o: change in the molecular weight was less than 5%

Δ: change in the molecular weight was 5% or more and less than 10% x: change in the molecular weight was 10% or more

<Water Dispersibility>

Predetermined amounts of a basic compound and water were added to the polyester resin. After that, the temperature was kept at 60° C. and the system was stirred for 60 to 90 minutes at 400 rpm. The water dispersibility was judged by naked eyes.

(Judgment)

o: Undispersed thing entirely disappeared within 60 minutes and the resin was completely dispersed.

Δ: Undispersed thing existed even when the system was stirred for more than 60 minutes to less than 90 minutes.

x: The resin was not dispersed at all even when the system was stirred for 90 minutes or longer.

<Average Particle Size of Water Dispersion>

Arithmetic average diameter of the water dispersion sample based on volume particle size was measured using Horiba LB-500. The measured value was adopted as an average particle size of the water dispersion. However, for the case wherein the water dispersibility was judged as Δ or x, the average particle size was not measured, and the average particle size was just indicated as "-".

<Preparation of Aqueous Adhesive>

A water dispersion was compounded with a water-soluble epoxy resin (sorbitol-type polyglycidyl ether) SR-SEP (manufactured by Sakamoto Yakuhin Kogyo) as a curing agent in a ratio as shown in Table 3 so as to prepare an aqueous adhesive.

<Preparation of a Sample for Evaluation of Adhesive Property>

An aqueous adhesive was applied to a corona-treated surface of PET film in 25 μm thickness (manufactured by Toyobo) so as to make the thickness of the adhesive layer after drying 5 μm followed by drying at 80° C. for 5 minutes. A surface of the adhesive layer was laminated with a corona-treated surface of another PET film in 25 μm thickness. The resulting laminate was pressed at 80° C. under a pressure of 3 kgf/cm² and cured by a heating treatment at 40° C. for 8 hours so as to prepare a sample for the evaluation of adhesive property (for initial evaluation).

<Evaluation of Adhesive Property>

Peel strength of the sample for evaluation of adhesive property was measured so as to evaluate the adhesive property. A 180°-peel test was conducted at 25° C. under a tensile velocity of 300 mm/min so as to measure the peel strength. In view of a practical property, the peel strength of 2N/cm or more is judged as good. For the case wherein the water dispersibility was judged as Δ or x, an aqueous adhesive was prepared using a supernatant liquid part and preparation of a sample for the evaluation of adhesive property was tried. However, since the concentration of the effective ingredient is small, it was not possible to apply the aqueous adhesive so as to make the thickness of the adhesive layer after drying 5 μm. When a sample was prepared only in an applicable amount and the peel strength was measured, the peel strength was 0.1/cm or less. Therefore, it was judged that precise measurement was impossible and the adhesive property was expressed as "-".

<Evaluation of Water Resistance>

The above sample for the evaluation of adhesive property was immersed in water at 25° C. for five hours. After that, water on the sample surface was well wiped off. A 180° peel test was conducted at 25° C. under the tensile velocity of 300 mm/min so as to measure the peel strength. For the case wherein the water dispersibility was judged as 4 or x, almost no adhesive property was exhibited. Therefore, water resistance was not measured but the water resistance was expressed as "-".

Hereinafter, abbreviation of the compounds shown in the text and the table in Examples indicates each of the following compounds.

TMP: trimethylol propane
PE: pentaerythritol
DPE: dipentaerythritol
INO: inositol
SOR: sorbitol
NPG: neopentyl glycol
T: terephthalic acid
I: isophthalic acid
SA: sebacic acid
AA: adipic acid
EG: ethylene glycol
DEG: diethylene glycol
PG: propylene glycol
BD: butanediol
TMA: trimellitic anhydride
SC: succinic anhydride
MA: maleic anhydride
TEA: triethylamine
DMEA: dimethylethanolamine
TETA: triethanolamine
AN: aqueous ammonia (28%)
NaHCO₃: sodium hydrogen carbonate Example A-1

Preparation of Polyester Resin No. 1

Into a 500-ml glass flask equipped with thermometer, stirrer and Liebig cooling jacket were charged 68.7 parts of sebacic acid and 31.7 parts of ethylene glycol. An esterifying reaction was conducted during 3 hours from 160° C. to 230° C. under 2 nitrogen atmospheric pressure. After releasing the pressure, 0.01 part of tetrabutyl titanate was added thereto. After that, pressure of the system was gradually reduced to 5 mmHg during 30 minutes. Polycondensation reaction was conducted at 260° C. for 40 minutes under the vacuum of 0.3 mmHg or lower. After that, 2.0 parts of pentaerythritol was added thereto followed by stirring at 210° C. for two hours. Then 8.2 parts of trimellitic anhydride was added thereto followed by stirring at 210° C. for two hours. After that, the content was taken out and cooled. Composition, number-average molecular weight, etc. of the resulting polyester resin No. 1 are shown in Tale 1.

Examples A-2 to A-6 and Comparative Examples A-7 to A-11

Preparation of polyester resins Nos. 2 to 11

Polyester resins Nos. 2 to 11 were synthesized in the same manner as in the case of the polyester resin No. 1 except that the charging materials and the ratio thereof were changed. They were subjected to the evaluation as same as in the case of the polyester resin No. 1. Results of the evaluation are shown in Table 1 and Table 2.

TABLE 1

| Examples | | | A-1 | A-2 | A-3 | A-4 | A-5 | A-6 |
|---|---|---|---|---|---|---|---|---|
| Resin No. | | | 1 | 2 | 3 | 4 | 5 | 6 |
| Resin composition | W— | TMP | | | | | | 1.3 |
| | | PE | 2.0 | | 1.2 | | 1.5 | |
| | | DPE | | | | 1.2 | | |
| | | INO | | | 1.5 | | | |
| | | SOR | | 1.5 | | | | |
| | | NPG | | | | | | |
| | —(CO—Z—CO)— | T | | 36.5 | | 47.2 | | 25.5 |
| | | I | | | 49.0 | | | 18.3 |
| | | SA | 68.7 | | | | 58.7 | |
| | | AA | | 21.5 | | 17.8 | 10.5 | |
| | —(O—Y—O)— | EG | 21.1 | 4.5 | | 12.6 | 18.0 | |
| | | DEG | | | 25.1 | | 7.6 | 43.8 |
| | | PG | | | 4.5 | 15.5 | | |
| | | BD | | 26.5 | | | | |
| | —X | TMA | 8.2 | 7.3 | 17.2 | 5.7 | | 11.1 |
| | | SC | | 2.2 | 1.5 | | 2.2 | |
| | | MA | | | | | 1.5 | |
| | acid value (eq/10$^6$) | | 850 | 985 | 1,935 | 592 | 366 | 1,052 |
| | number-average molecular weight | | 6,677 | 12,401 | 5,855 | 20,855 | 9,388 | 10,329 |
| | average value of p | | 5.7 | 7.5 | 3.5 | 14.1 | 8.5 | 12.6 |
| | average value of q | | 2.8 | 4.0 | 4.2 | 4.4 | 2.4 | 2.4 |
| | average value of r | | 1.2 | 0.0 | 2.8 | 0.5 | 1.6 | 0.6 |
| | value of (q + r) | | 4.0 | 4.0 | 7.0 | 4.9 | 4.0 | 3.0 |
| | stability upon storage | | ○ | ○ | ○ | ○ | ○ | ○ |

TABLE 2

| Comparative Examples | | | A-7 | A-8 | A-9 | A-10 | A-11 |
|---|---|---|---|---|---|---|---|
| Resin No. | | | 7 | 8 | 9 | 10 | 11 |
| Resin composition | W— | TMP | | | | | |
| | | PE | 0.3 | 7.4 | | 0.6 | |
| | | DPE | | | 3.6 | 0.6 | |
| | | INO | | | | | |
| | | SOR | | | | | |
| | | NPG | | | | | 1.7 |
| | —(CO—Z—CO)— | T | | 55.9 | | | 27.9 |
| | | I | | | 41.7 | 32.7 | |
| | | SA | 62.9 | | | 17.1 | 34.0 |
| | | AA | 5.0 | | 15.7 | | |
| | —(O—Y—O)— | EG | 10.7 | 8.4 | | 8.7 | |
| | | DEG | | | 30.4 | 14.9 | 25.0 |
| | | PG | | | | | 7.7 |
| | | BD | 15.6 | 18.2 | 6.5 | | |
| | —X | TMA | 5.5 | | | 19.7 | |
| | | SC | | 5.1 | | 5.6 | 3.7 |
| | | MA | | 5.1 | 2.2 | | |
| | acid value (eq/10$^6$) | | 576 | 1,021 | 219 | 2,618 | 370 |
| | number-average molecular weight | | 51,183 | 1,837 | 7,091 | 15,988 | 6,180 |
| | average value of p | | 44.0 | 1.5 | 4.2 | 9.4 | 10.4 |
| | average value of q | | 4.0 | 0.3 | 4.8 | 4.1 | 1.8 |

TABLE 2-continued

| Comparative Examples | A-7 | A-8 | A-9 | A-10 | A-11 |
|---|---|---|---|---|---|
| average value of r | 0.0 | 3.7 | 1.2 | 0.6 | 0.2 |
| value of (q + r) | 4.0 | 4.0 | 6.0 | 4.7 | 2.0 |
| stability upon storage | ○ | ○ | ○ | x | ○ |

Since the polyester resin No. 7 has a large number-average molecular weight, it is out of the scope of the present invention. Since the polyester resin No. 8 has a small number-average molecular weight and a small average value of p, it is out of the scope of the present invention. Since the polyester resin No. 9 has a low resin acid value, it is out of the scope of the present invention. Since the polyester resin No. 10 has a high resin acid value, it is out of the scope of the present invention. The reason why the stability upon storage of the polyester resin No. 10 is inferior is presumed to be due to the fact that the acid value is high and thus the water absorbing property is high. In the polyester resin No. 11, a site corresponding to W in the polyester resin of the present invention is a divalent organic group and thus the value of (q+r) is small. Accordingly, the polyester resin No. 11 is out of the scope of the present invention.

Example C-1

Preparation and Evaluation of Water Dispersion of Polyester Resin and Aqueous Adhesive Into a 500-ml glass flask equipped with thermometer, stirrer and Liebig cooling jacket were charged 30 parts of polyester resin No. 1, 9.0 parts of AN and 70 parts of ion-exchange water. They were heated up to 70° C. and stirred for 1 hour. After that, the content was taken out and cooled so as to give a water dispersion 1 of polyester resin. Particle size of the resulting water dispersion was measured. A curing agent was further compounded therewith. Adhesive property and water resistance of the resulting coat were evaluated. Results are shown in Table 3.

Examples C-2 to C-6

Water dispersions C-2 to C-6 of polyester resin were prepared in the same manner as in Example C-1 except that the charging materials and the ratio thereof were changed. Further, a curing agent was compound with the water dispersions C-2 to C-6 in the same manner as in Example C-1. Adhesive property and water resistance of the resulting coat were evaluated. Results are shown in Table 3. Any of them showed high water dispersibility. Moreover, the cured coat showed high adhesive property and water resistance.

Examples C-7 to C-11

Preparation of water dispersions of the polyester resin were attempted in the same manner as in Example 1 except that the charging materials and the ratio thereof were changed. For the cases wherein the water dispersions could be prepared, a curing agent was compounded in the same manner as in Example C-1. Adhesive property and water resistance of the resulting coat were evaluated. Results are shown in Table 4.

TABLE 3

| | | | | Examples | | | | | |
|---|---|---|---|---|---|---|---|---|---|
| | | | | C-1 | C-2 | C-3 | C-4 | C-5 | C-6 |
| Composition | water dispersion | resin | type | 1 | 2 | 3 | 4 | 5 | 6 |
| | | | parts by mass | 30 | 25 | 30 | 30 | 20 | 30 |
| | | basic compound | type | AN | TETA | TEA | TETA | NaHCO$_3$ | TETA |
| | | | parts by mass | 9.0 | 2.6 | 13.0 | 1.9 | 1.2 | 3.1 |
| | | ion-exchange water | parts by mass | 70 | 75 | 70 | 70 | 80 | 70 |
| | curing agent | SR-SEP | parts by mass | 4.3 | 4.1 | 9.9 | 3.0 | 1.2 | 5.2 |
| Characteristics of water dispersion | | water dispersibility | | ○ | ○ | ○ | ○ | ○ | ○ |
| | | particle size (nm) | | <40 | 90 | <40 | 120 | 120 | 80 |
| Characteristics of adhesive | | adhesive property | | >10 | >10 | 5.3 | >10 | 7.3 | >10 |
| | | water resistance | | >10 | >10 | 4.6 | 8.5 | 7.2 | 6.8 |

TABLE 4

| | | | | Comparative Examples | | | | |
|---|---|---|---|---|---|---|---|---|
| | | | | C-7 | C-8 | C-9 | C-10 | C-11 |
| Composition | water dispersion | resin | type | 7 | 8 | 9 | 10 | 11 |
| | | | parts by mass | 25 | 30 | 25 | 20 | 30 |
| | | basic compound | type | TETA | AN | TEA | NaHCO$_3$ | TETA |
| | | | parts by mass | 1.5 | 6.0 | 1.2 | 18.5 | 1.2 |
| | | ion-exchange water | parts by mass | 75 | 70 | 75 | 80 | 70 |
| | curing agent | SR-SEP | parts by mass | 2.4 | 5.2 | 0.9 | 8.9 | 1.9 |
| Characteristics of water dispersion | | water dispersibility | | x | ○ | x | ○ | x |
| | | particle size (nm) | | — | <40 | — | 140 | — |
| Characteristics of adhesive | | adhesive property (N/cm) | | — | 0.8 | — | 2.4 | — |
| | | water resistance (N/cm) | | — | 0.2 | — | 1.1 | — |

The polyester resin No. 7 used in Comparative Example C-7 showed almost no progress in dispersing the resin after stirring for 1 hour. The stirring was continued for another one hour, but almost no resin was dispersed. Since the polyester resin No. 7 has a large number-average molecular weight of the resin, it is out of the scope of the present invention. It is presumed that the number-average molecular weight of the resin was large and accordingly that a cohesive property of the resin became large whereby almost no resin was dispersed.

Comparative Example C-8 was poor in the adhesive property and the water resistance. Since the polyester resin No. 8 used in Comparative Example C-8 has a small number-average molecular weight of the resin and a small average value of p, it is out of the scope of the present invention. It is presumed that, since the number-average molecular weight was small, the cohesive property was small and thus the adhesive property was poor.

In Comparative Example C-9, undissolved thing exists abundantly even after stirring for one hour. The stirring was continued for another one hour, but almost no resin was dispersed. Since the polyester resin No. 9 used in Comparative Example C-9 has a low resin acid value, it is out of the scope of the present invention. It is presumed that, since the acid value of the resin was small, the dispersibility in water was low.

Comparative Example C-10 was poor in its water resistance. Since the resin No. 10 used in Comparative Example C-10 has a high resin acid value, it is out of the scope of the present invention. Although a curing agent in an amount being equivalent to the acid value was compounded, it can be hardly said that all carboxyl groups were reacted. It is presumed that the water resistance became poor since a lot of unreacted carboxyl groups remained.

Since the resin No. 11 used in Comparative Example C-11 has a small value of (q+r), it is out of the scope of the present invention. It is presumed that the dispersibility in water became low since a number of the carboxylic acid per one molecular chain was small.

<Paint>

Preparation Example of Aqueous Paint (D-1)

Into a 500-ml glass flask equipped with thermometer, stirrer and Liebig cooling jacket were charged 100 parts of polyester resin No. 1, 18.9 parts of TEA and 233 parts of ion-exchange water. Temperature was raised up to 70° C. followed by stirring for one hour. After that, the content was taken out, cooled and filtered through a 100-mesh filter cloth. To the resulting filtrate were added 20 parts of a melamine curing agent (M-40W manufactured by Sumitomo Chemical), 150 parts of ion-exchange water, 50 parts of titanium oxide (CR-93 manufactured by Ishihara Sangyo) and 2.5 parts of a 10% solution of sodium dodecylbenzenesulfonate in benzyl alcohol. The mixture was shaken for 3 hours using a glass bead-type high-speed shaker so as to homogeneously disperse whereupon an aqueous paint (D-1) was prepared.

Preparation Example of Aqueous Paint (D-2)

The same compounding ratio and preparation method for the aqueous paint (D-1) were conducted except that the polyester resin No. 2 was used instead of the polyester resin No. 1 and that the amount of TEA was changed to 21.9 parts so as to give an aqueous paint (D-2).

A coat property test was conducted using the above aqueous paints (D-1) and (D-2). Incidentally, preparation and evaluation of the coated plate were conducted according to the following methods. Results are shown in Table 5.

TABLE 5

|  |  |  | D-1 | D-2 |
|---|---|---|---|---|
| Water dispersion | resin | type | 1 | 2 |
|  |  | parts by mass | 100 | 100 |
|  | basic compound | type | TEA | TEA |
|  |  | parts by mass | 18.9 | 21.9 |
|  | ion-exchange water | parts by mass | 233 | 233 |
| Curing agent | M-40W | parts by mass | 20 | 20 |
| Inorganic pigments | titanium oxide (CR-93) | parts by mass | 50 | 50 |
| Catalyst | 10% solution of sodium dodecylbenzenesulfonate | parts by mass | 2.5 | 2.5 |
| Ion-exchange water |  | parts by mass | 150 | 150 |
| Paint solids |  | % by mass | 30 | 30 |
| Evaluation items | gloss |  | ○ | ○○ |
|  | resistance to boiling water |  | ○ | ○○ |
|  | resistance to solvent |  | >50 | >50 |
|  | adhesive property |  | ○ | ○○ |

Preparation of a Coated Plate

The above aqueous paints (D-1) and (D-2) were applied to a hot-dip galvanized steel sheet and dried at 80° C. for 10 minutes. After that, baking was conducted at 140° C. for 30 minutes so as to give a coated steel plate. The film thickness of a coated layer after drying was adjusted to be 5 μm.

Methods for Evaluation

1. Gloss

Reflection at 60° of the coated surface of the coated steel plate was measured using a gloss meter (manufactured by Tokyo Denshoku).

○○: 90 or more

○: 80 or more and less than 90

Δ: 50 or more and less than 80 x: less than 50

2. Resistance Test to Boiling Water

After immersing the coated steel plate into boiling water for two hours, appearance of the coat (state of generation of blister) was evaluated.

○○: No blister noted.

○: Area of blister generation was more than 0% and less than 10%.

Δ: Area of blister generation was 10% or more and less than 50%.

x: Area of blister generation was 50% or more.

3. Resistance to Solvent

In a chamber of 20° C., load of 1 kg/cm$^2$ was applied to a coated surface using a gauze impregnated with methyl ethyl ketone, and the gauze was reciprocated between the length of 5 cm. Times of the reciprocation until the undercoat appeared were recorded. The case wherein no undercoat appeared even by fifty times of reciprocations was expressed as >50. The more the reciprocation times, the better the hardening property of the coat.

4. Adhesive Property

Parallel each 11 straight lines crossing at right angles were drawn with intervals of 1 mm on the coat surface of a test plate so as to reach the base material using a cutter knife according to a chessboard tape method of JIS K-5400 whereupon 100 squares of 1 mm×1 mm were prepared. An adhesive tape of Cellophane was tightly adhered to the surface thereof. After that, the tape was quickly peeled off. The peeled-off degree of the squares at that time was observed and evaluated according to the following criteria.

○○: Peeling-off of the coat was not noted at all.

○: Although the coat was slightly peeled off, 90 or more squares still remained.

Δ: The coat was peeled off and a number of the remained squares was 50 or more and less than 90.

x: The coat was peeled off and the number of the remained squares was less than 50.

\<Ink\>

Preparation Example of Aqueous Ink (E-1)

Into a 2000-ml glass flask equipped with thermometer, stirrer and Liebig cooling jacket were charged 100 parts of polyester resin No. 1, 18.9 parts of TEA and 233 parts of water. Temperature was raised up to 70° C. followed by stirring for one hour. After that, the above was cooled down to 30° C. Then, 19.6 parts of water dispersion of iron oxide yellow (MF-5050 Yellow manufactured by Dainichi Seika Kogyo; solid content: 510), 690.2 parts of ion-exchange water and 55 parts of 2-propanol were added thereto followed by stirring for another 1 hour. After that, the content was taken out and filtered through a 100-mesh filter cloth so as to give an aqueous ink (E-1).

Preparation Example of Aqueous Ink (E-2)

The same compounding ratio and preparation method for the aqueous ink (E-1) were conducted except that the polyester resin No. 2 was used instead of the polyester resin No. 1 and that the amount of TEA was changed to 21.9 parts so as to give an aqueous ink. A coat property test of ink was conducted using the above aqueous inks (E-1) and (E-2). Incidentally, preparation and evaluation of the samples were conducted according to the following methods. Results are shown in Table 6.

TABLE 6

| | | | E-1 | E-2 |
|---|---|---|---|---|
| Water dispersion | resin | type | 1 | 2 |
| | | parts by mass | 100 | 100 |
| | basic compound | type | TEA | TEA |
| | | parts by mass | 18.9 | 21.9 |
| | ion-exchange water | parts by mass | 233 | 233 |
| Water dispersion of pigments | MF-5050Yellow | parts by mass | 19.6 | 19.6 |
| Adjusting agent for surface tension | 2-propanol | parts by mass | 55 | 55 |
| Ion-exchange water | | parts by mass | 690.2 | 690.2 |
| Solid content of ink | | % by mass | 10 | 10 |
| Evaluation items | dispersing stability | | ○ | ○○ |
| | water resistance | | ○ | ○○ |

\<Evaluation of Dispersing Stability of Aqueous Ink\>

The above aqueous inks (E-1) and (E-2) were stored at 20° C. and −5° C. for two weeks. A change in the appearance of the ink after the storage was evaluated.

○○: Appearance change was not noted at all.

○: Appearance change was rarely noted. (Although sediments were generated, they could be dispersed again by stirring.)

Δ: Sediments were slightly generated. (There remained some sediments which could not be dispersed again even by stirring.)

x: Sediments were generated.

\<Preparation of a Sample for Evaluation of Water Resistance\>

Each of the aqueous inks (E-1) and (E-2) was applied to the corona-treated surface of a PET film in the thickness of 25 μm (manufactured by Toyobo) so as to make the thickness of the ink layer after drying 2 μm, and dried at 80° C. for 30 minutes so as to prepare a sample for the evaluation of water resistance.

\<Evaluation of Water Resistance\>

The above sample for the evaluation of water resistance was immersed in ion-exchange water at 25° C. for 5 hours. After that, water on the sample surface was well wiped off. A change in the appearance was checked.

○○: No change in the appearance was noted at all.

○: Almost no change in the appearance was noted. (Trace of permeation of water into only a small part of the interface between the coat and the substrate was noted.)

Δ: Swelling by water was noted in a part of the coat.

x: Peeling-off or dissolution happened on the whole surface.

INDUSTRIAL APPLICABILITY

The polyester resin of the present invention can be easily dispersed into water by using only a basic compound and water, and thus can provide an environmentally friendly resin and water dispersion. In addition, a coat having high adhesive property and water resistance can be provided by compounding with a curing agent.

The invention claimed is:

1. A polyester resin represented by the following chemical structure of formula (I) and having an acid value of 250 to 2,500 eq/$10^6$ g and a number-average molecular weight of 2,000 to 50,000:

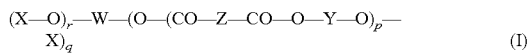

(I)

wherein W is a residue of a polyhydric alcohol having hydroxyl groups in numbers of (q+r);

(CO—Z—CO—O—Y—O) is a skeleton of polyester resin prepared by polymerization using a polyvalent carboxylic acid ingredient Z and a polyhydric alcohol ingredient Y as polymerizing ingredients;

X is a residue of polybasic acid having two or more carboxyl groups or is hydrogen (except the case wherein all of X in numbers of (q+r) are hydrogen);

X, Y and Z each may be the same as or different from each other and, even in the same repetitive unit, X, Y and Z each may be the same as or different from each other;

average value of p is 3 or more, average value of q is more than 0 and is 15 or less, average value of r is 0 or more and is less than 15, and (q+r) is 3 or more and 15 or less; and wherein the ratio of the carboxyl group equivalent derived from X and the equivalent of W is 3.39 to 12.57.

2. The polyester resin according to claim 1, wherein W in the formula (I) is one or more residue(s) selected from the group consisting of a residue of pentaerythritol, a residue of sorbitol and a residue of inositol.

3. The polyester resin according to claim 1, wherein X in the formula (I) is one or more residue(s) selected from the group consisting of a residue of trimellitic anhydride, a residue of succinic anhydride and a residue of maleic anhydride.

4. A water dispersion of polyester resin containing the polyester resin according to claim 1, a basic compound and water.

5. The water dispersion of polyester resin according to claim 4, wherein it contains no emulsifier.

6. The water dispersion of polyester resin according to claim 4, wherein it contains no organic solvent.

7. The water dispersion of polyester resin according to claim 4, wherein it further contains a curing agent.

8. The water dispersion of polyester resin according to claim 7, wherein the curing agent is one or two or more member(s) selected from the group consisting of polyvalent epoxy compound, oxazoline resin, carbodiimide resin, isocyanate compound, melamine resin and polyvalent metal salt.

9. An aqueous adhesive containing the water dispersion of polyester resin according to claim 7.

10. An aqueous paint containing the water dispersion of polyester resin according to claim 7.

11. An aqueous ink containing the water dispersion of polyester resin according to claim 7 and a coloring material.

12. A method for preparing a water dispersion of polyester resin, comprising a step wherein the polyester resin according to claim 1, a basic compound and water are mixed without addition of any emulsifier and organic solvent, whereby the water dispersion of the polyester resin is obtained.

13. A laminate comprising a layer containing the polyester resin according to claim 1 (layer A) and a layer made of film, sheet, woven fabric, nonwoven fabric or paper (layer B).

14. A packaging material having the laminate according to claim 13 as a constituting element.

* * * * *